(12) United States Patent
Calagaz et al.

(10) Patent No.: US 11,951,404 B2
(45) Date of Patent: Apr. 9, 2024

(54) SYSTEM AND METHOD FOR VERIFYING IMAGE DATA IN REMOTE LOCATIONS

(71) Applicant: Fishing Chaos, Inc, Mobile, AL (US)

(72) Inventors: John Calagaz, Mobile, AL (US); James Hunter Adams, Mobile, AL (US)

(73) Assignee: Fishing Chaos, Inc, Mobile, AL (US)

( * ) Notice: Subject to any disclaimer, the term of this patent is extended or adjusted under 35 U.S.C. 154(b) by 233 days.

(21) Appl. No.: 17/674,031

(22) Filed: Feb. 17, 2022

(65) Prior Publication Data

US 2022/0258043 A1 Aug. 18, 2022

Related U.S. Application Data

(60) Provisional application No. 63/151,007, filed on Feb. 18, 2021.

(51) Int. Cl.
*A63F 13/837* (2014.01)
*G06T 1/00* (2006.01)

(52) U.S. Cl.
CPC .......... *A63F 13/837* (2014.09); *G06T 1/0021* (2013.01)

(58) Field of Classification Search
CPC ... A63F 13/837; G06T 1/0021; G06Q 30/018; G06Q 50/02
See application file for complete search history.

(56) References Cited

U.S. PATENT DOCUMENTS 9,621,565 B2 * 4/2017 Stack .................... G06F 21/645

* cited by examiner

*Primary Examiner* — Christopher Wait
(74) *Attorney, Agent, or Firm* — AdamsIP, LLC; Edward Brinkley Garner, III; James Hunter Adams

(57) ABSTRACT

A system and method for measuring an attribute of wildlife/marine life and confirming that measurement as legitimate by matching a digital code of the measurement device with a digital lock of the system is provided. A user may capture image data using a camera of a computing device, wherein the image data may contain measurement data that may be extracted and saved to a user's user profile. The system may determine if the data is legitimate based on a digital code contained within the image data and a digital lock of the system. The system may also create a digital fingerprint using a cryptographic hash function and data associated with the image data. The system may subsequently watermark a digital image with said digital fingerprint to create a watermarked digital image, wherein said digital image was created using said image data having said associated data.

33 Claims, 7 Drawing Sheets

SYSTEM AND METHOD FOR VERIFYING IMAGE DATA IN REMOTE LOCATIONS

CROSS REFERENCES

This application claims the benefit of U.S. Provisional Application No. 63/151,007, filed on Feb. 18, 2021, which application is incorporated herein by reference.

FIELD OF THE DISCLOSURE

The subject matter of the present disclosure refers generally to a system and method for verifying image data in remote locations.

BACKGROUND

Virtual sporting tournaments are becoming more popular due not only to convenience but also because it is necessary due to ever evolving public health concerns. The sport of fishing has been particularly active in adopting virtual sporting tournaments since catch and release tournaments are becoming more commonplace. However, virtual sporting tournaments do have some drawbacks. For instance, without the physical specimen in hand, additional steps must be taken in order to prevent cheating since the outcome of many of these tournaments are dependent on the word of the participants. If the attributes such as weight, length, location, time, etc. are not taken in a way that can alleviate all doubt, it is possible that fisherman participating in the event could manipulate the system in a way that gives them a decided advantage, and since many fishing tournaments award the top finishers with monetary rewards, developing methods to curtail cheating in these virtual sporting tournaments is a high priority.

Currently, the most common method to prevent cheating includes giving each participant a token that must be included in any image taken of caught marine life, wherein the token is only given to participants of the tournament in a time period prior to the start of the event that would make cheating less likely. The appearance of the token in the image is used to verify that the marine life was caught during the designated timeframe of the tournament. And though this method may help ensure that marine life was caught during the designated timeframe, it does not guarantee that a participant has not gained an advantage in some other fashion. For instance, the participant may be using a measuring instrument to measure the marine life that is not regulation. Or perhaps the participant used an image editing software to include the token in an image taken at a time prior to the start of the tournament. In addition to the limited cheating prevention potential of this method, transporting the token can be inconvenient to the participant. And if the participant leaves or loses the token, he may be disqualified from the event.

Accordingly, there is a need in the art for a system and method that allows participants in virtual sporting tournaments to remotely measure attributes of wildlife/marine life in a way that prevents many methods of cheating currently in usage today.

SUMMARY

A system and method for measuring an attribute of wildlife/marine life and confirming that measurement as legitimate by matching a digital code of the measurement device with a digital lock of the system is provided. In one aspect, the system allows a user to capture image data using a camera of a computing device, wherein the image data may contain measurement data that may be extracted and saved to a user's user profile. In another aspect, the system may determine if the image data is legitimate based on a digital code contained within the image data and a digital lock of the system. In yet another aspect, the system may create a digital fingerprint using a cryptographic hash function and data associated with the image data that may be used to create tagged image data. Generally, the system and method of the present disclosure allows users to remotely measure physical attributes of wildlife/marine life in a way that prevents said users from later manipulating data associated with said physical attributes.

The system generally comprises a computing device having a camera, light, control board operably connected to the light, power supply, processor operably connected to the computing device, and non-transitory computer-readable medium coupled to the processor and having instructions stored thereon. A user interface of the computing device may be used so that a user can login to a user profile so that image data obtained by the camera might be associated with a user profile of said user. Alternatively, a user identifier containing user data may be used by the system to associate image data with a particular user profile. In some embodiments, the user identifier may comprise a user identification (UID) pattern that may be captured within image data by the camera, wherein said UID pattern associates a particular user with a user profile of the system. In other embodiments, the user data may be contained within memory of a communication device of the user identifier, wherein said user data is transferred to the computing device prior to or during the capture of image data using the camera.

The light is configured to emit a pattern that associates the image with a particular tournament associated with the user profile of the user, which is captured within the image data and deciphered by the system. This pattern may be converted into a digital code that may match a digital lock of the system, which may be used to confirm data as legitimate or illegitimate after being captured by the various components of the system. The system may create digital fingerprints using data captured by the system, wherein said digital fingerprints may contain the information used to create it. These digital fingerprints are preferably encrypted in a way that prevents users of the system from deciphering the digital fingerprint without having the cryptographic hash function used to encrypt the digital fingerprint. The digital fingerprint may then be used to create tagged image data, wherein said tagged image data is preferably in the form of a digitally watermarked image or enhanced metadata image.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). As will be evident from the disclosure provided below, the present invention satisfies the need for a system and method capable of managing equipment of a marine activity without human intervention, and thereby improving upon known systems currently employed within the art.

Figure 1:
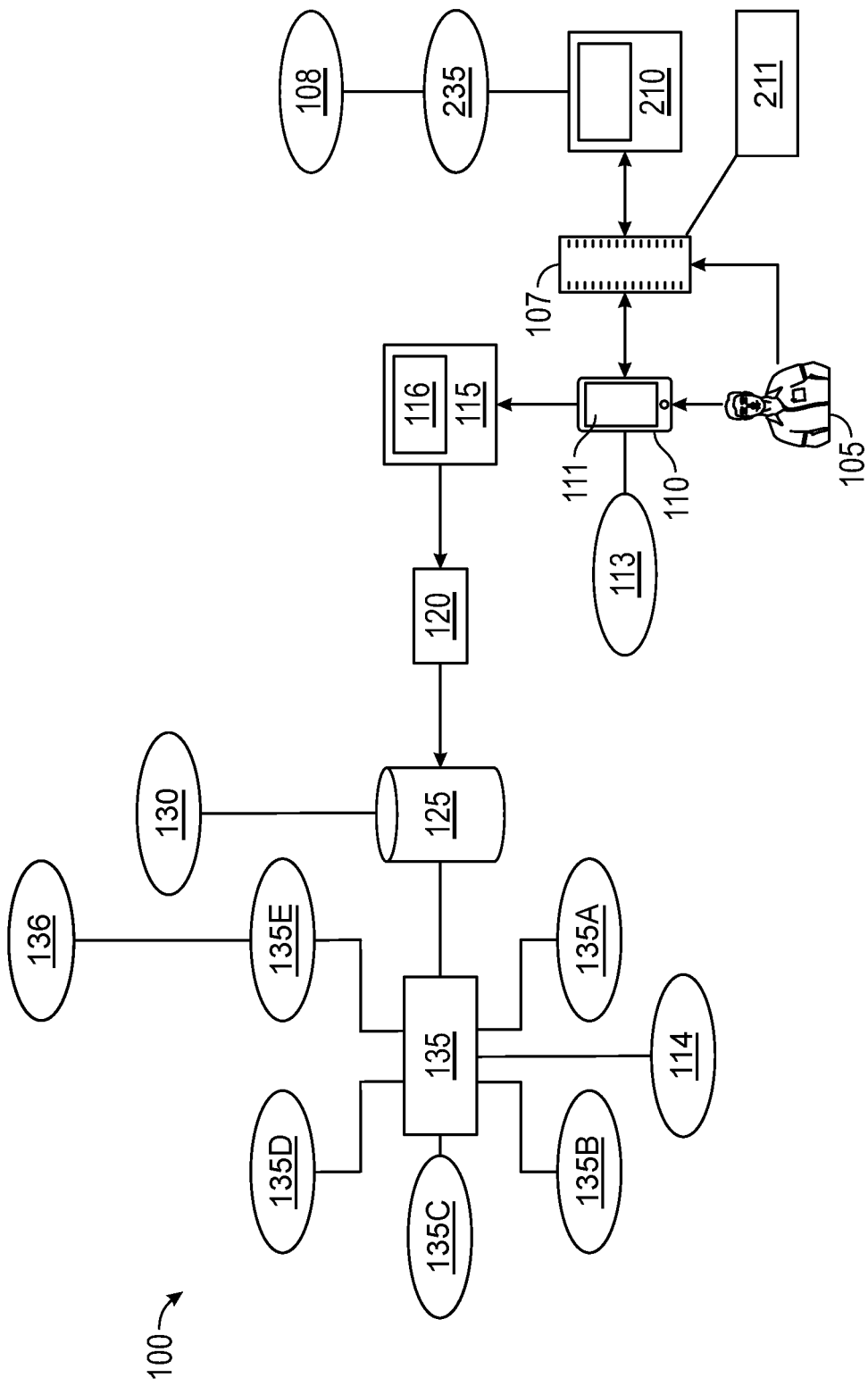
FIG. 1 is a diagram illustrating a system embodying features consistent with the principles of the present disclosure.
Figure 2:
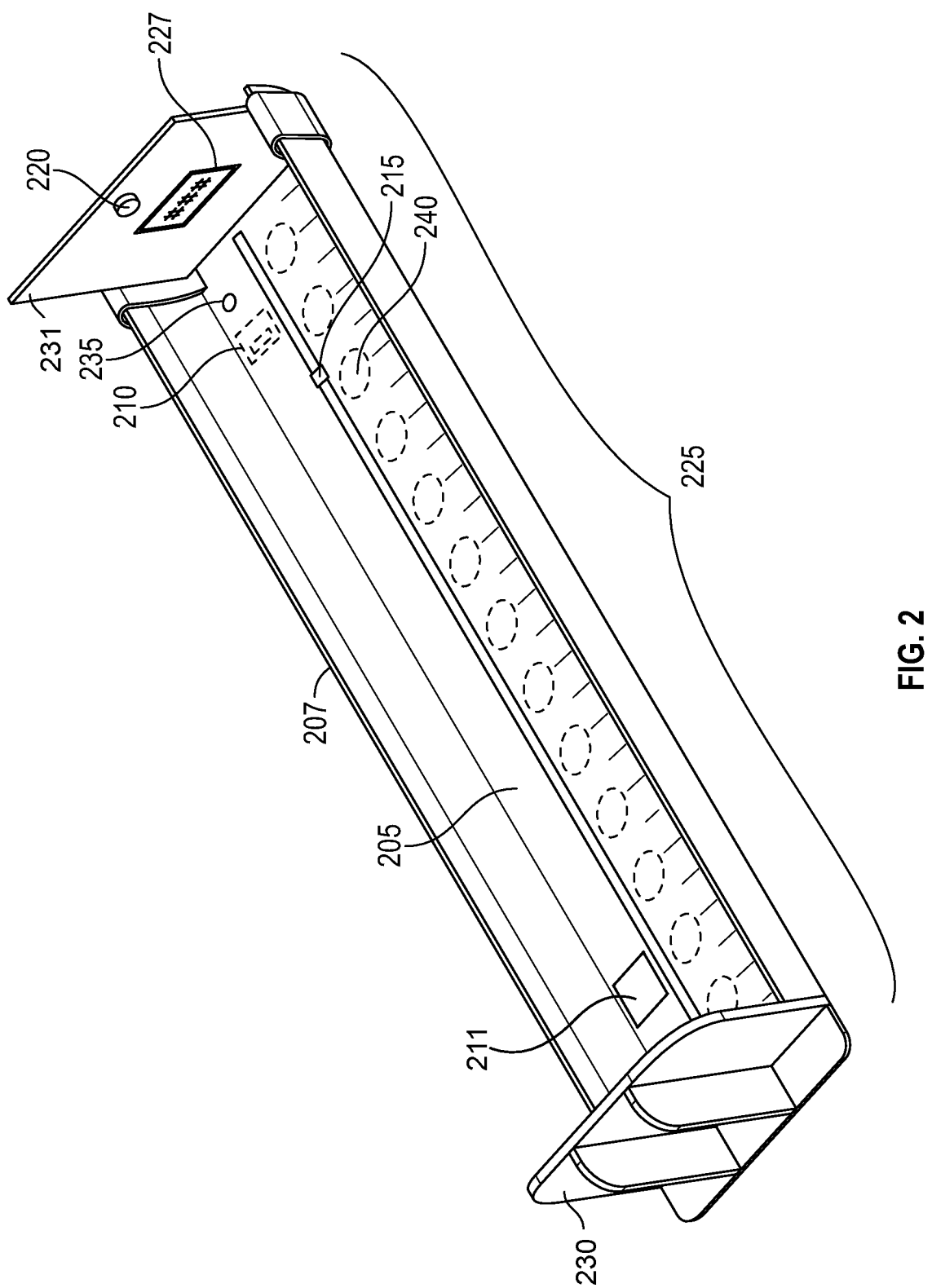
FIG. 2 is a diagram illustrating a system embodying features consistent with the principles of the present disclosure.
Figure 3:
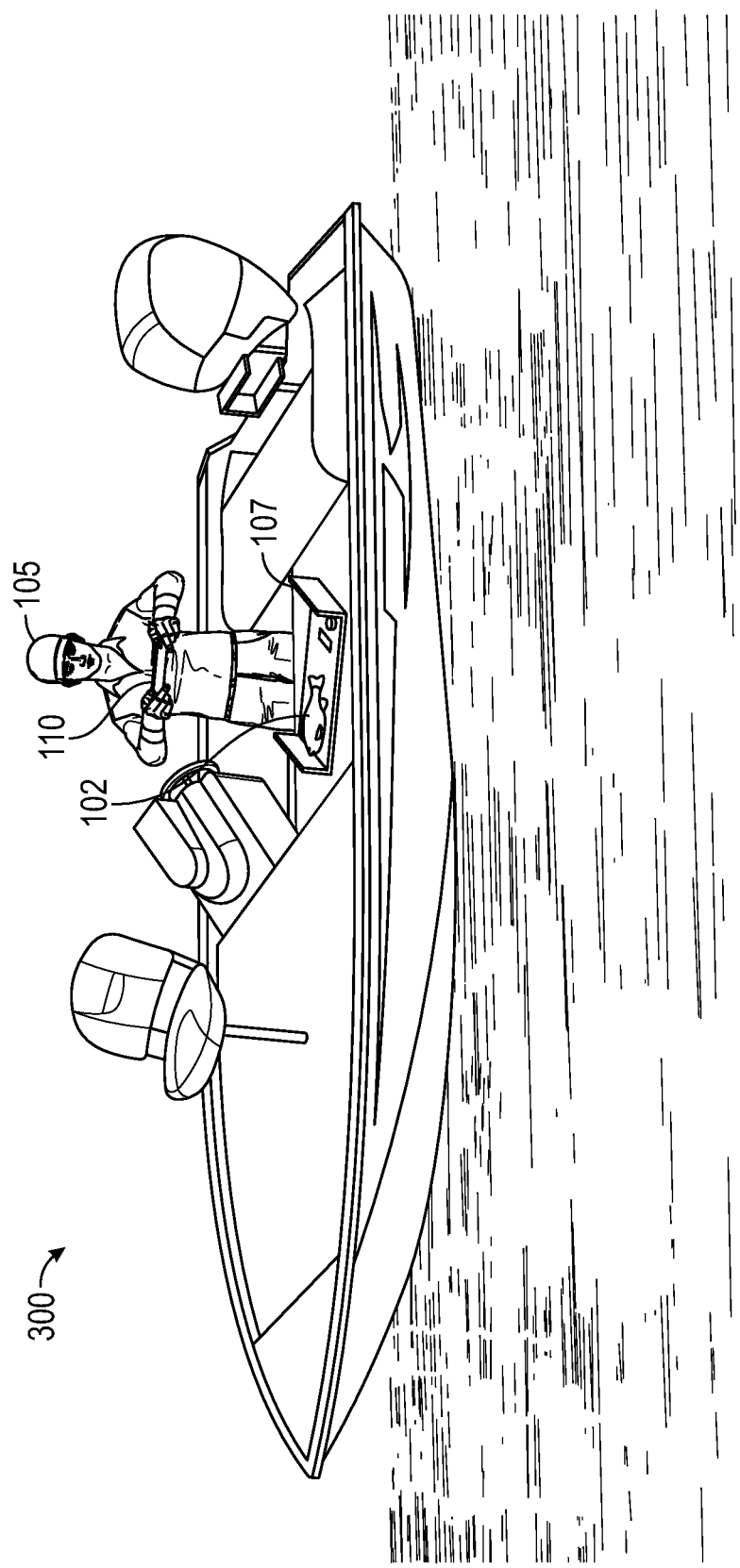
FIG. 3 is a diagram illustrating a system embodying features consistent with the principles of the present disclosure.
Figure 4:
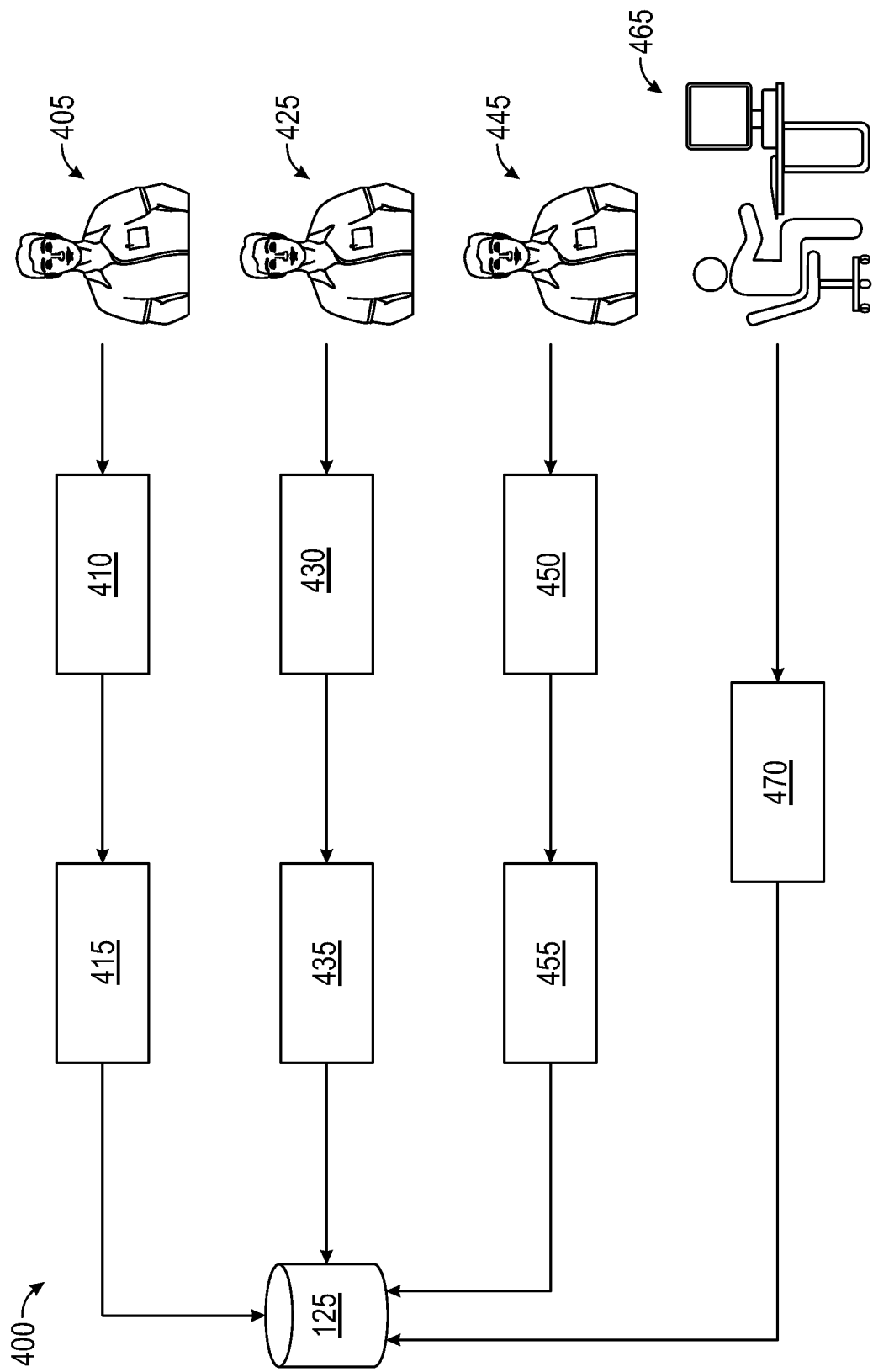
FIG. 4 is a diagram illustrating the manner in which individual access to data may be granted or limited based on user roles or administrator roles.
Figure 5:
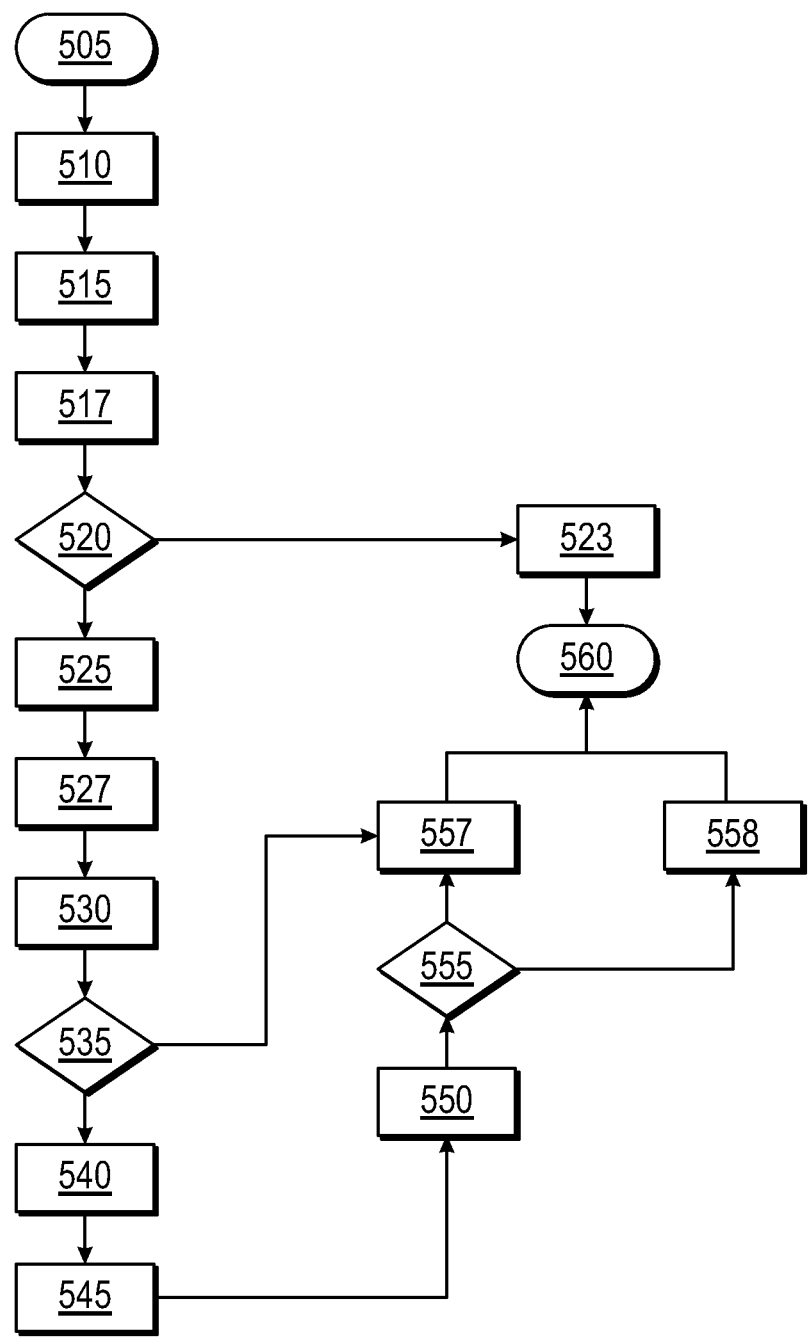
FIG. 5 is a flow chart illustrating certain preferred method steps that may be used by the system of the present disclosure.
Figure 6:
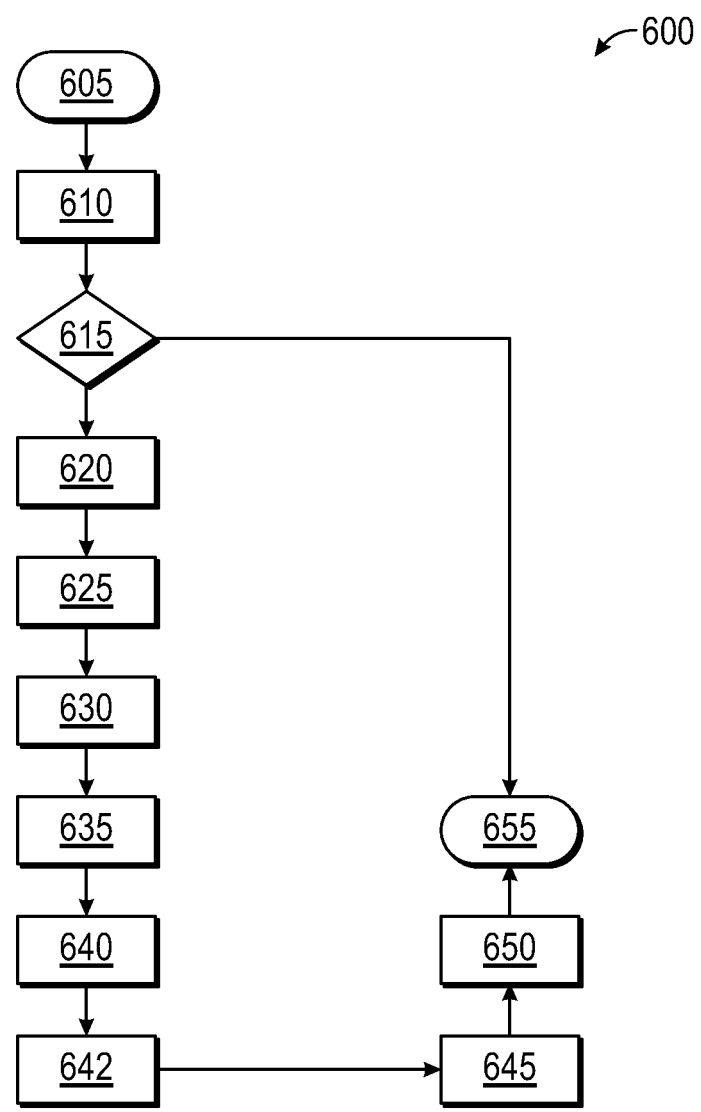
FIG. 6 is a flow chart illustrating certain preferred method steps that may be used by the system of the present disclosure.
Figure 7:
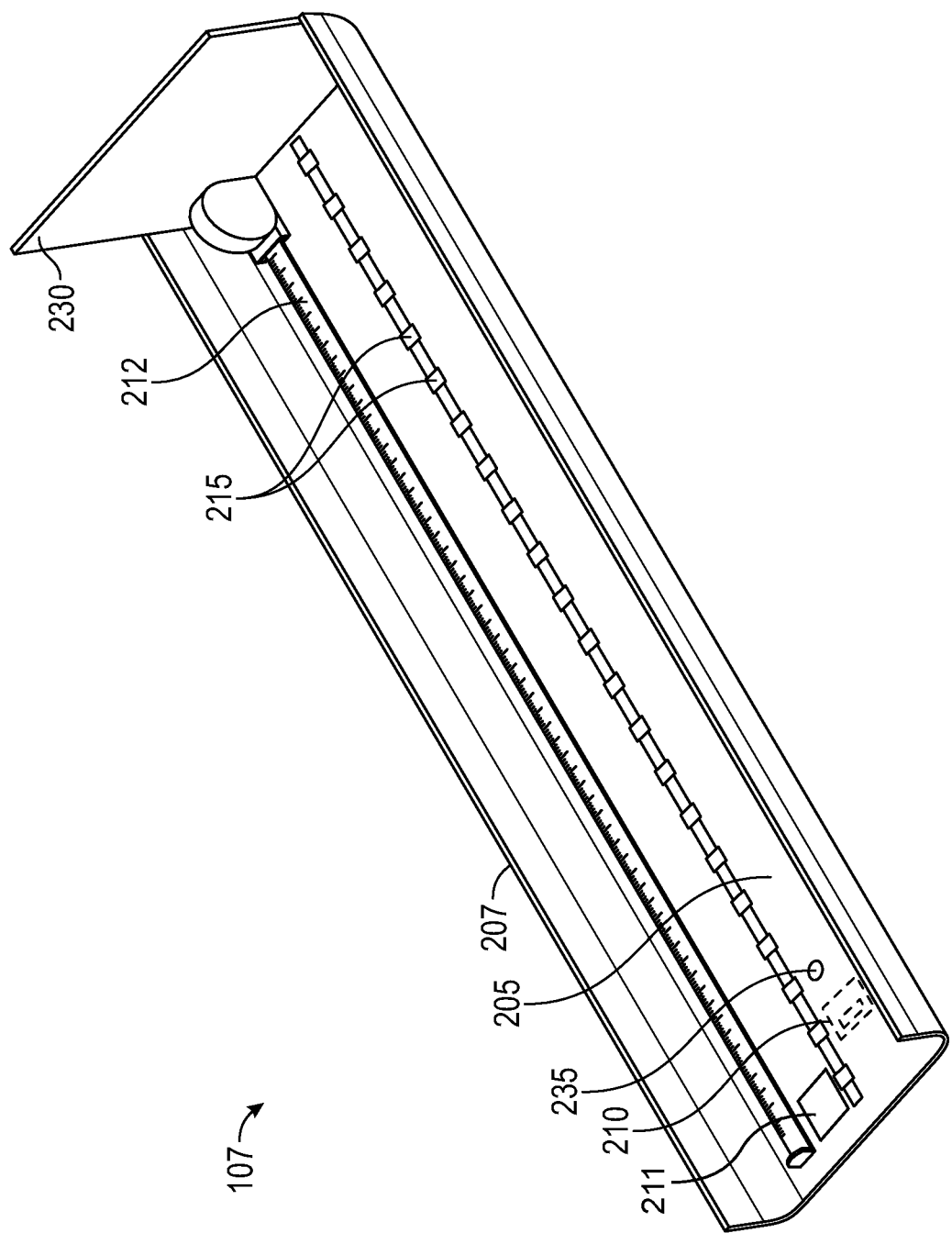
FIG. 7 a diagram illustrating a system embodying features consistent with the principles of the present disclosure.

FIGS. 1-6 illustrate preferred embodiments of a system 100 and methods 500, 600 designed to allow the remote measurement of wildlife/marine life 102 in a way such that it can be confirmed for accuracy. FIG. 1 illustrates a system 100 configured to collect image data 135D and convert said image data 135D into tagged image data 135E, wherein said tagged image data 135E contains a digital fingerprint 136 that confirms the user 105 and at least one of date, time, location, and physical attributes of marine life/wildlife. FIG. 2 illustrates a perspective view of the system 100 having weight sensors 240 and a slidable light sensor 215. FIG. 3 illustrates how a user 105 may measure the length of a fish using the system 100 within an environment 300. FIG. 4 illustrates permission levels 400 that may be utilized by the present system 100 for controlling access to user content 415, 435, 455. FIG. 5 illustrates a method 500 for extracting measurement data 135C from image data 135D and subsequently verifying said measurement data 135C using a digital code 114 and digital lock 113. FIG. 6 illustrates a method 600 for encrypting measurement data 135C and associating it with image data 135D by way of a cryptographic hash function 130. FIG. 7 illustrates a perspective view of the system 100 having a flexible tape 212 and a plurality of light sensors 215 in a line. It is understood that the various method steps associated with the methods of the present disclosure may be carried out as operations by the system 100 shown in FIG. 1.

As illustrated in FIG. 1, the system 100 of the present disclosure generally comprises a computing device 110 having a camera, light 235, control board 210 operably connected to the light 235, power supply, processor 115 operably connected to the computing device 110, and non-transitory computer-readable medium 116 coupled to the processor 115 and having instructions stored thereon. The computing device 110 may comprise a user interface 111 that may be used to control the camera in order to capture image data 135D, as illustrated in FIG. 3. In some preferred embodiments, a user interface 111 of the computing device 110 allows a user 105 to login to a user profile 135 so that image data 135D obtained by the camera might be associated with a user profile 135 of said user 105. In other preferred embodiments, the system 100 may include a user identifier 211 containing user data 135A that is used by the system 100 to associate image data 135D with a particular user profile 135. In one embodiment, the user identifier 211 comprises a user identification (UID) pattern that may be captured within image data 135D by the camera, wherein said UID pattern associates a particular user with a user profile 135 of the system 100. In another embodiment, the user data 135A may be contained within memory of a communication device, wherein said user data 135A is transferred to the computing device 110 prior to or during the capture of image data 135D using the camera.

In some preferred embodiments, the light 235, control board 210, and user identifier 211 may be connected to a measurement device 107, wherein said measurement device 107 comprises markings that when captured within image data 135D can instruct the system 100 as to physical attributes of marine life/wildlife. Alternatively, the light 235, control board 210, and user identifier 211 may be secured to a card or hunting/fishing equipment, including, but not limited to, tackle boxes, fishing rods, fishing reels, marine vehicles, bows, and firearms. For instance, a compound bow may have an NFC device and light 235 embedded in the riser, wherein a computing device 110 of said may receive user data 135A from the NFC device that associates said computing device 110 with a user profile 135 of said user 105. Once the computing device 110 has been associated with the user profile 135, the bow may be positioned near a deer shot by the user 105, and the user 105 may then take an image of the deer and the bow. Because the computing device 110 is associated with a user profile 135 of the system 100, image data 135D taken with said computing device 110 will also be associated with this user profile 135. The light 235 is configured to emit a pattern that associates the image with a particular tournament associated with the user profile 135 of the user 105, which is captured within the image data 135D and deciphered by the system 100. In another preferred embodiment, the system 100 may further comprise at least one sensor 112, which may be used to collect environmental data 135B that may be used to assist the system 100 to confirm whether measurement data 135C is legitimate. This environmental data 135B may also be incorporated into the digital fingerprint 136 used by the system 100 to prevent the unwanted tampering of image data 135D within the system 100.

In another preferred embodiment, the system 100 may further comprise a database 125 operably connected to the computing device 110 having a plurality of user profiles 135 in which the various data of the system 100 may be stored. In yet another preferred embodiment, a server 120 may be operably connected to the database 125 and processor 115, facilitating the transfer of information between the processor 115 and database 125. In yet another preferred embodiment, at least one sensor 112 may be used to convey environmental data 135B to the processor 115. The various components of the system 100 of the present disclosure may be operably connected to one another via a wired or wireless connection via a communication device. The database 125 may be populated by a user 105 who uploads image data 135D either directly to the database 125 or who inputs data into the user interface 111 of the computing device 110 that is subsequently transferred to the database 125.

The system 100 is designed to measure an attribute of wildlife/marine life 102 and confirm that the measurement is legitimate by determining whether a digital code 114 of the measurement device 107 matches a digital lock 113 of the system 100, wherein said digital code 114 is preferably a PIN. A PIN may be defined as a key having a predefined number of characters. The system 100 may compare the digital code 114 to a digital lock 113 of the system 100, which may allow the system 100 to verify data as legitimate/illegitimate and/or unlock certain features of the system 100, such as features of the user interface 111. In some embodiments, the system 100 may extract measurement data 135C and patterns from image data 135D captured by the system 100, wherein the patterns may be converted into one or more digital codes 114 and compared to one or more digital locks 113 associated with the user's 105 user profile 135. In a preferred embodiment, patterns that the system 100 may convert into a digital lock 113 include, but are not limited to, QR codes, bar codes, light patterns, or any combination thereof.

Comparing the digital code 114 and digital lock 113 may instruct the system 100 as to whether or not the measurement device 107 is legitimate and/or where image data 135D should be saved within a user profile 135 of a user 105. In some embodiments, a matching digital code 114 and digital lock 113 may also be required prior to the user 105 being allowed to capture image data 135D using the system 100. For instance, a digital code 114 contained within the user data 135A of the user identifier 211 may be used to unlock a user interface 111 of a computing device 110 so that a user 105 may take image data 135D with a camera of the computing device 110. Preferably, the system 100 may encrypt data associated with the image data 135D and subsequently create tagged image data 135E, wherein tagged image data 135E includes, but is not limited to, a digitally watermarked image, enhanced metadata image, and any combination thereof. The digitally watermarked image is preferably created and saved as imaged data is captured by the system 100, thus preventing a user 105 from manipulating image data 135D or any data associated with said image data 135D after capture. The enhanced metadata image would have an encrypted digital fingerprint s136 aved within the metadata, wherein the encrypted digital fingerprint 136 contains information including, but not limited to, user data 135A, date data, time data, geolocation data, tournament data, or any combination thereof.

Types of data that may be saved in the system 100 include, but are not limited to, measurement data 135C, environmental data 135B, image data 135D, and user data 135A, or any combination thereof. Measurement data 135C may be defined as data containing information about a measurable attribute of wildlife/marine life 102. Environmental data 135B may be defined as data pertaining to a user's 105 environment. Image data 135D may be defined as data containing pictures encoded as binary data, which preferably contain picture elements in the form of pixels. Image data 135D may contain a single frame of reference or multiple frames of reference strung together to create a video. Image data 135D may also contain metadata, including, but not limited to, audio data, date data, time data, camera setting data (aperture, shutter speed, focal length, metering mode, and iso speed), descriptions, copyright data, geospatial data, or any combination thereof. For instance, an image formatted in the exchangeable image format (Exif) may contain pixels, data and time information, geospatial data, and audio data. User data 135A may be defined as information that may be used to identify a particular user 105.

The processor 115 is configured to perform the operations disclosed herein based on instructions stored within the system 100. The processor 115 may be any processor 115 or microprocessor 115 suitable for executing instructions. In some embodiments, the processor 115 may have a memory device therein or coupled thereto suitable for storing the data, content 415, 435, 455, or other information or material disclosed herein. In some instances, the processor 115 may be a component of a larger computing device 110. The processor 115 may process instructions for execution within computing devices 110, including instructions stored in memory or on a storage device, to display graphical information for a graphical user interface 111 (GUI) on an external input/output device, such as a display. The processor 115 may provide for coordination of the other components of a computing device 110, such as control of user interfaces 111, applications run by a computing device 110, and wireless communication by a communication device of the computing device 110. A computing device 110 that may house the processor 115 therein may include, but are not limited to, laptops, desktops, workstations, personal digital assistants, servers 120, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers 120, mainframes, cellular telephones, tablet computers, or any other similar device.

In a preferred embodiment, the programming instructions responsible for the operations carried out by the processor 115 are stored on a non-transitory computer-readable medium 116 ("CRM"), which may be coupled to the server 120, as shown in FIG. 1. Alternatively, the programming instructions may be stored or included within the processor 115. Examples of non-transitory computer-readable mediums 116 include, but are not limited to, magnetic media such as hard disks, floppy disks, and magnetic tape; optical media such as CD ROM discs and DVDs; magneto-optical media such as optical discs; and hardware devices that are specifically configured to store and perform programming instructions, such as read-only memory (ROM), random access memory (RAM), flash memory, and the like. In some embodiments, the programming instructions may be stored as modules within the non-transitory computer-readable medium 116. The software instructions may be read into memory from another non-transitory computer-readable medium 116 or from another device. Alternatively, hard-wired circuitry may be used in place of or in combination with software instructions to implement processes consistent with the principles of the invention. Thus, implementations consistent with the principles of the invention are not limited to any specific combination of hardware circuitry and software.

In an embodiment, the system 100 may further comprise a computing device 110 operably connected to the processor 115. A computing device 110 may be implemented in a number of different forms, including, but not limited to, servers 120, multipurpose computers, mobile computers, etc. For instance, a computing device 110 may be implemented in a multipurpose computer that acts as a personal computer for a user 105, such as a laptop computer. For instance, components from a computing device 110 may be combined in a way such that a mobile computing device 110 is created, such as mobile phone. Additionally, a computing device 110 may be made up of a single computer or multiple computers working together over a network. For instance, a computing device 110 may be implemented as a single server 120 or as a group of servers 120 working together over and Local Area Network (LAN), such as a rack server 120 system 100. Computing devices 110 may communicate via a wired or wireless connection. For instance, wireless communication may occur using a Bluetooth, Wi-Fi, or other such wireless communication device.

In a preferred embodiment, as illustrated in FIG. 1, the computing device 110 is a mobile computing device 110. Mobile computing devices 110 may include, but are not limited to, cellular telephones, smart phones, personal digital assistants, tablet computers, or other similar mobile computing devices 110. In an embodiment, computing devices 110 may communicate audibly, meaning computing devices 110 may transmit and receive information via sound waves and covert the sound waves into digital information. For instance, a user 105 may instruct a user interface 111 of a computing device 110 with their voice to perform a certain action. The processor 115 may convert the sound waves of the user 105 into instructions, which the processor 115 may then carry out. Computing devices 110 may likewise generate audible sound for a user 105, such as through an audio device. Such sound may include sound from voice telephone calls, recorded notes, voice messages, music files, etc. Audible sounds may also include sound generated by applications operating on a computing device 110. For instance, an application running on a mobile computing device 110 may be configured in a way such that when a certain condition is met the application causes the mobile computing device 110 to output a sound. For instance, an application may be configured in a way such that an alarming sound is emitted via an audio device connected to the computing device 110 to indicate when a fishing tournament has ended. For instance, the processor 115 may receive a signal indicating that measurement data 135C has been validated by the system 100. The processor 115 may then convert this signal into an audio message that may be sent to an audio device to make the user 105 aware that the data has been validated.

As mentioned previously, the computing device 110 may further comprise a user interface 111. A user interface 111 may be defined as a space where interactions between a user 105 and the system 100 may take place. In a preferred embodiment, the interactions may take place in a way such that a user 105 may control the operations of the system 100. A user interface 111 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. In some embodiments, the user interface 111 may be operably connected to back-end hardware, such as a server 120, and/or software that separately handles permission levels 400 of the various users 105. The system 100 may present data of the user interface 111 to the user 105 via a display operably connected to the processor 115. A display may be defined as an output device that communicates data that may include, but is not limited to, visual, auditory, cutaneous, kinesthetic, olfactory, and gustatory, or any combination thereof.

Information presented via a display may be referred to as a soft copy of the information because the information exists electronically and is presented for a temporary period of time. Information stored on the non-transitory computer-readable medium 116 may be referred to as the hard copy of the information. For instance, a display may present a soft copy of visual information via a liquid crystal display (LCD), wherein the hardcopy of the visual information is stored on a local hard drive. For instance, a display may present a soft copy of audio information via a speaker, wherein the hard copy of the audio information is stored on a flash drive. For instance, a display may present a soft copy of tactile information via a vibration device within the computing device 110, wherein the hard copy of the tactile information is stored within a database 125. Displays may include, but are not limited to, cathode ray tube monitors, LCD monitors, light emitting diode (LED) monitors, gas plasma monitors, screen readers, speech synthesizers, haptic suits, speakers, and scent generating devices, or any combination thereof.

In a preferred embodiment, the measurement device 107 comprises a platform 205. The platform 205 preferably has markings 225 thereon that extend from a proximal end to a distal end of the platform 205, which may be used to measure a length of wildlife/marine life 102. In a preferred embodiment, the measurement device 107 further comprises a head piece 230 at the proximal end of the platform 205. The markings 225 of the platform 205 preferably begin at the point in which the head piece 230 attaches to the platform 205. In a preferred embodiment, the markings 225 allow a user 105 to measure the length of wildlife/marine life 102. For instance, a user 105 may place one end of the wildlife/marine life 102 against said head piece 230 as a starting point to begin a measurement. In some preferred embodiments, the measurement device 107 may comprise a second head piece 231 at the distal end of said platform 205. At least one of the head pieces 230, 231 may be configured to move about the platform 205 in a way such that its position about the platform 205 may be changed, as illustrated in FIG. 2.

In another preferred embodiment, as illustrated in FIG. 7, the measurement device 107 may comprise a flexible tape 212 having markings thereon, which may be used to measure the length or girth of wildlife/marine life 102. The flexible tape 212 preferably has markings 225 thereon that may be used by the system 100 to extract the length or girth of said wildlife/marine life 102 from said image data 135D. The flexible tape 212 may extend perpendicularly to the axis on which the markings 225 pertaining to length extend. In yet another preferred embodiment, the measurement device 107 may further comprise at least one weight sensor 240, wherein said at least one weight sensor 240 may be used to measure the weight of said wildlife/marine life 102. A digital display 227 may be used to display the measured weight of the wildlife/marine life 102 to a user 105. In embodiments of a system 100 comprising two head pieces 230, 231, wherein at least one of said head pieces is a sliding head piece 231, wherein said sliding head piece 231 is slidably attached to rails 207 of said measurement device 107. A distance measurer 220 secured to at least one of said head pieces 230, 231 may be used to measure the distance between said head pieces 230, 231. In a preferred embodiment, an ultrasonic measurer or laser measurer may be used as the distance measurer 220; however, other types of measurers may be used without departing from the inventive subject matter herein. A user 105 measuring the length of wildlife/marine life 102 using such a board may position one head piece 230, 231 at a first end of the wildlife/marine life 102 and position the other head piece 230, 231 at a second end of the wildlife/marine life 102. The distance between the two head pieces 230, 231 will coincide with the length of the wildlife, which may then be presented on the digital display 227.

Other preferred embodiments of the system 100 may comprise at least one light sensor 215 configured to sense light in order to measure a length of marine life placed on the measurement device 107. In a preferred embodiment, as illustrated in FIG. 7, a plurality of light sensors 215 is placed in line about the length of the measurement device 107. The system 100 may determine the length of the marine life based on the which light sensor 215 moving from a top light sensor 215 to a bottom light sensor 215 is the first to detect light and/or last to detect no light, wherein each sensor of the plurality of sensors located between said top light sensor 215 and said bottom light sensor 215 is associated with a particular length. Alternatively, the system 100 may determine the length of the marine life based on the which light sensor 215 moving from a bottom light sensor 215 to a top light sensor 215 is the last to detect light and/or first to detect no light to slide about a track of the platform 205. In another preferred embodiment, as illustrated in FIG. 2, a light sensor 215 attached to a sliding element may be used to measure the length of marine life placed on the measurement device 107. A user 105 may slide the light sensor 215 up and down a track to which the sliding element is slidably secured in order to determine the point at which light is able to reach the light sensor 215. When wildlife/marine life 102 is placed on the platform 205, the earliest point in which light reaches the light sensor 215 may indicate the length of the wildlife/marine life 102. In a preferred embodiment, the sliding element is a knob, but other sliding elements may be used without departing from the inventive subject matter described herein. In some preferred embodiments, a user 105 may manipulate a portion of the sliding element located on the back side of the platform, allowing a user 105 to move the light sensor 215 about the track. This may allow the user 105 to move the light sensor 215 without having to move any wildlife/marine life 102 placed on the face of the platform 205.

A light 235 of the measurement device 107 may be used to indicate when sufficient light is reaching the light sensor 215 so that the length of marine life may be measured. For instance, a user 105 may place a redfish on a platform 205 of a measurement device 107 having a light sensor 215 and two lights 235, wherein one light 235 is a red light and the other is a green light. When the redfish is initially placed on the measurement device 107, the redfish may be covering up the light sensor 215 secured to a sliding element, and the measurement device 107 may indicate that light is not reaching the light sensor 215 by only powering the red light. The user 105 may slide the light sensor 215 about the track using the portion of the sliding element located on the back side of the platform 205 until the point at which light is reaching the light sensor 215, and the measurement device 107 may then indicate that light is reaching the light sensor 215 by only powering the green light. In some preferred embodiments, markings 225 coinciding with the point at which the light sensor 215 is receiving light may indicate the length of the wildlife/marine life 102. In other preferred embodiments, the system 100 may be configured to digitally provided a length of marine life based on the location of the sliding element about the length of the track.

In a preferred embodiments a light 235 configured to transmit a pattern may be attached to the measurement device 107. Types of lights 235 that may be used by the system 100 to emit the pattern include, but are not limited to, light emitting diodes (LED), infrared (IR), fluorescent, or any combination thereof. The pattern emitted by the light 235 is determined by the control board 210 operably connected to the light 235. In a preferred embodiment, the light 235 is attached to the platform 205; however, the light 235 may be attached to at least one head piece 230, 231 without departing from the subject matter described herein. In a preferred embodiment, the light 235 is attached to the measurement device 107 in a way such that both the pattern emitted by the light 235 and the markings 225 are visible when measuring wildlife/marine life 102. Making both the light 235 and markings 225 visible when measuring wildlife/marine life 102 may allow a user 105 to capture both the markings 225 on the measurement device 107 and the pattern emitted by the light 235 when using the camera to capture image data 135D.

Materials that may be used to construct the measurement device 107 include, but are not limited to, polymer, steel, aluminum, rubber, or any combination thereof. Some preferred embodiments of the measurement device 107 may be constructed in a way such that they are buoyant and float in water. For instance, the measurement device 107 may be completely constructed of a material that has a density lower than that of water. For instance, the device may be partially constructed of a material having a density lower than that of water so at least a portion of the device floats when placed in water. For instance, the measurement device 107 may be constructed in a way that includes air pockets within the platform 205 of the measurement device 107, which make the resulting measurement device 107 structure less dense than water despite the material used. Other preferred embodiments of the measurement device 107 may comprise a float. For instance, a measurement device 107 made of steel may have a float connected thereto, which may allow the measurement device 107 to float in water.

The control board 210 comprises at least one circuit and a microchip. Some embodiments of the control board 210 may further comprise a wireless communication device, such as Bluetooth, NFC, or an antenna. The wireless communication device may be used to transmit information to or receive information from a computing device 110, including user data 135A that the system 100 may use to associate a computing device (and therefore image data 135D taken with a camera of said computing device) with a user profile 135. The control board 210 may regulate the transfer of power to the various components of the measurement device 107 and control the pattern emitted by the light 235. The microchip of the control board 210 comprises a microprocessor 115 and memory. The microprocessor 115 may be defined as a multipurpose, clock driven, register based, digital-integrated circuit which accepts binary data as input, processes it according to instructions stored in its memory, and provides results as output. The microprocessor 115 may receive a signal that instructs it to begin emitting the pattern via the light 235.

In a preferred embodiment, the microprocessor 115 of the control board 210 receives said signal via a physical switch connected to the control board 210. In a preferred embodiment, the switch is a button located on the measurement device 107 and operably connected to the control board 210. When a user 105 interacts with the switch, a signal is sent to the microprocessor 115 of the control board 210, which prompts the microprocessor 115 to relay the digital code 114 by way of a pattern via the light 235. Alternatively, the microprocessor 115 may receive the signal to emit the pattern via a light 235 from a computing device 110 operably connected to the control board 210 via a wireless communication device. The microprocessor 115 may access the digital code 114 from memory of the control board 210 when prompted and convey the digital code 114 via the light 235. In a preferred embodiment, the digital code 114 emitted by the light 235 associates image data 135D with a particular event, such as a fishing/hunting tournament. However, the digital code 114 emitted by the light 235 may be used in other ways by the system 100 without departing from the inventive subject matter described herein. For instance, the digital code 114 emitted by the light 235 may serve as additional bit of information that may be used by the system 100 in conjunction with the user data 135A of the user identifier 211 to associate image data 135D with a particular user profile 135.

In a preferred embodiment, pattern instructions 108 for emitting a pattern via the light 235 are stored in the memory of the control board 210. For instance, the communication device may transmit pattern instructions 108 to the microprocessor 115 from the computing device 110 that cause the microprocessor 115 to retrieve pattern instructions 108 from the memory that instruct the processor 115 in how to carry out the transmission of said pattern using the light 235. In some preferred embodiments, the system 100 may change the digital code 114 within the memory by pattern instructions 108 received via the wireless communication device. For instance, a user 105 may place a computing device 110 having an NFC device therein near the wireless communication device of the control board 210. The computing device 110 may transmit pattern instructions 108 to the control board 210 that instruct the microprocessor 115 to alter the digital code 114 stored within the memory. By using the computing device 110 to change the digital code 114, the digital code 114 may be associated with a particular event and subsequently used to verify that a user 105 has permission to participate in a particular event. For instance, the system 100 may comprise a plurality of events, wherein each event requires a unique digital lock 113 to participate therein. A user 105 may enter the event using the user interface 111 of the system 100, and the computing device 110 may then be used to update the control board 210 (via the wireless communication device) with a digital code 114 matching the digital lock 113 associated with the desired event. Therefore, in some embodiments, the digital code 114 of the system 100 may be used as a digital token to verify that a user 105 has entered image data 135D into an event and/or is using a measurement device 107 authorized for said event.

Types of devices that may act as the wireless communication device include, but are not limited, to near field communication (NFC), Bluetooth, infrared (IR), radio-frequency communication (RFC), radio-frequency identification (RFID), and ANT+, or any combination thereof. In an embodiment, the wireless communication device may broadcast signals of more than one type. For instance, a control board 210 comprising an IR transmitter and RFID transmitter may broadcast IR signals and RFID signals. Alternatively, a wireless communication device may broadcast signals of only one type of signal. For instance, the control board 210 may be fitted with an equipment transmitter that may only transmit/broadcast RFC signals with a computing device 110.

The computing device 110 may detect the signals broadcast by the wireless communication device. As illustrated in FIG. 1, the computing device 110 is operably connected to the processor 115. In a preferred embodiment, the computing device 110 may be configured to detect a number of signal types that may be emitted by the control board 210, including, but not limited to, NFC, Bluetooth, IR, RFC, RFID, and ANT+, or any combination thereof. For instance, a computing device 110 may be configured to detect Bluetooth, NFC, and IR signals broadcast by one or more control boards 210. Alternatively, the computing device 110 may be configured to detect only one type signal emitted by a control board 210. For instance, a computing device 110 may be to only detect Bluetooth signals. As such, control boards 210, wireless communication devices, and computing devices 110 may be combined in multiple ways without departing from the inventive subject matter as described herein.

In another embodiment, at least one sensor 112 may be used to measure environmental conditions as image data 135D is taken and transmit said environmental data 135B to the processor 115. An environmental condition may be defined as external conditions experienced by a user 105. Types of sensors that may be used as an at least one sensor 112 include, but are not limited to, a microphone, turbidity sensor, thermometer, humidity sensor, passive infrared sensor, light sensor 215, lightning sensor, wind transducer, compass, global positioning system (GPS), gyroscope, accelerometer, barometer, or any combination thereof. Therefore, the at least one sensor 112 may measure a variety of types of environmental data 135B and transmit that data to the processor 115. Once the processor 115 has received the environmental data 135B, the processor 115 may save the environmental data 135B within the user profile 135. In some preferred embodiments, environmental data 135B may be used to verify whether measurement data 135C is legitimate. For instance, an event within the system 100 may have a defined geolocation range. A user 105 entered into that event may transmit geolocation data to the system 100 when capturing image data 135D, and the system 100 may compare the geolocation data obtained with the geolocation range of the event to verify that a user 105 is within the specified geolocation range of said event.

Measurement data 135C, environmental data 135B, image data 135D, and user data 135A are preferably saved in user profiles 135 of the system 100. In a preferred embodiment, the user profile 135 may be saved to the non-transitory computer-readable medium 116. Alternatively, the user profile 135 may be saved to a database 125. A user 105 may manually or automatically update a user profile 135 using a computing device 110. In a preferred embodiment, the computing device 110 may comprise a user interface 111, which a user 105 may use to manually or automatically update data within the user profile 135. For instance, environmental data 135B may be automatically uploaded to a user profile 135 when detected by the at least one sensor 112 of the system 100. For instance, geospatial data may be automatically uploaded to a user profile 135 when image data 135D is captured by the computing device 110. In another preferred embodiment, the user 105 may manually update data within user profiles 135. This may be done through use of, but not limited to, a camera, scanning device, keyboard, mouse, voice recognition and/or biometric mechanisms, etc. For instance, a user 105 may manually capture image data 135D using the camera of the computing device 110 prior to said data being automatically uploaded to a user profile 135. For instance, a user 105 may use a keypad to manually input use data into a user interface 111 of the computing device 110. Once a user 105 has manually captured/entered the data, the data may be transferred to a user profile 135 within the non-transitory computer-readable medium 116 and/or database 125 via the processor 115. For instance, a user 105 may manually input environmental data 135B into the user interface 111 of a computing device 110, which may subsequently be obtained from the computing device 110 by the database 125 via a processor 115 operably connected to the computing device 110. In a preferred embodiment, the image data 135D is obtained by the database 125 from the computing device 110 via the processor 115 whenever a user 105 is in an area in which the computing device 110 has internet connectivity.

In some preferred embodiments, the system 100 may determine whether measurement data 135C obtained from image data 135D is legitimate or illegitimate by comparing the digital code 114—obtained by the computing device 110 from the user identifier 211 and/or by transforming a pattern emitted by the light 235 (and captured within the image data 135D)—to at least one digital lock 113 of the system 100. Legitimate data may be defined as data that has been captured by a computing device 110 after said computing device 110 has been associated with user profile 135 via at least one digital code 114 that matches at least one digital lock 113 of said user profile 135. In some preferred embodiments, measurement data 135C may be both legitimate and illegitimate. For instance, the system 100 may tag measurement data 135C as legitimate for measurement purposes but illegitimate as far as participation purposes for an event that a user 105 is not registered to compete in. This might occur in instances in which a digital code 114 of a user identifier 211 matches a digital lock 113 of a user profile 135 but a pattern emitted by a light 235 does not match a digital lock 113 of a user profile 135 that would associate the image data 135D with a particular event. In a preferred embodiment, when a user 105 captures image data 135D using the camera of the computing device 110, the control board 210 of the measurement device 107 may be prompted via a computer readable signal transmitted by the computing device 110 to cause the light 235 to emit a pattern that is captured within the image data 135D. The system 100 may then extract from the image data 135D both the measurement data 135C and the pattern.

The pattern may be transformed into a digital code 114 based on instructions of the system 100, and that digital code 114 may be compared to a digital lock 113 of the system 100. In a preferred embodiment, the pattern emitted by the light 235 conveys binary the system 100 may extract and transform into the digital code 114. However, other methods of encoding text characters may be used by the system 100 without departing form the inventive subject matter herein. For instance, the control board 210 may use Morse Code to convey a PIN to the computing device 110 via the light 235. The system 100 may also use environmental data 135B in combination with the PIN to verify measurement data 135C as legitimate for a particular event. For instance, the system 100 may require that an encrypted digital code 114 and digital lock 113 not only be used to confirm that a user 105 is a legitimate participant in an event using an authorized measurement device 107 but may also require that geolocation data obtained while collecting image data 135D confirm that the user 105 is in a geolocation authorized for the event.

In other preferred embodiments, the system 100 may use encryption techniques to alter the pattern emitted by the light 235, digital code 114, and/or digital lock 113. For instance, an algorithm of the control board 210 and computing device 110 may cause the processors 115 of the system 100 to continuously alter the digital code 114 and/or digital lock 113 based on a clock. The digital code 114, digital lock 113, algorithm, and clock of a particular control board 210 and computing device 110 may be associated with a particular user profile 135, which may allow the system 100 to continuously alter the digital lock 113 of the system 100 to match the continuously changing digital code 114 of the control board 210. Alternatively, the pattern of a particular board may remain constant and associated with a particular user profile 135; however, an algorithm associated with a particular user's 105 user profile 135 may cause the computing device 110 to transform the pattern into a digital code 114 that the system 100 may then compare to a digital lock 113 of the user's 105 user profile 135. This may be done via a clock and algorithm as previously described.

As used herein, a database 125 refers to a set of related data and the way it is organized. Access to this data is usually provided by a database 125 management system (DBMS) consisting of an integrated set of computer software that allows users 105 to interact with one or more databases 125 and provides access to all of the data contained in the database 125. The DBMS provides various functions that allow entry, storage and retrieval of large quantities of information and provides ways to manage how that information is organized. Because of the close relationship between the database 125 and the DBMS, as used herein, the term database 125 refers to both a database 125 and DBMS.

As shown in FIG. 1, the database 125 may be configured to store data relating to the measurement of wildlife/marine life 102 therein. The processor 115 may be operably connected to the database 125 via wired or wireless connection. In a preferred embodiment, the information, data, and/or content 415, 435, 455 associated with a measurement of wildlife/marine life 102 may be stored as measurement data 135C within a user profile 135. In a preferred embodiment, the database 125 may be configured to store a plurality of user profiles 135 therein and the various information, data, and/or content 415, 435, 455 tied to or associated with such profiles. The database 125 may be a relational database such that the measurement data 135C, environmental data 135B, image data 135D, and user data 135A within a use profile within the plurality user profiles 135 may be stored, at least in part, in one or more tables. Alternatively, the database 125 may be an object database such that the measurement data 135C, environmental data 135B, image data 135D, and user data 135A within a user profile 135 within the plurality of user profiles 135 may be stored, at least in part, as objects. In some instances, the database 125 may comprise a relational and/or object database and a server 120 dedicated solely to managing the content 415, 435, 455 assigned to user profiles 135 in the manner disclosed herein. Although the database 125 is represented as a single entity within FIG. 1, it is understood that data, information, and/or content 415, 435, 455 stored within the database 125 or repository, as disclosed herein, may be stored within a plurality of databases 125 without departing from the inventive subject matter disclosed herein.

As mentioned previously, the system 100 may further comprise a server 120. A server 120 may be a search server, a document indexing server, and general web server. Servers 120 may be separate entities performing different functions or similar functions. For instance, two or more servers 120 may be implemented to work as a single server 120 performing the same tasks. Alternatively, one server 120 may perform the functions of multiple servers 120. For instance, a single server 120 may perform the tasks of a web server and an indexing server. Although represented as a single server 120 in FIG. 1, it is understood that multiple servers 120 may be used to operably connect the processor 115 to the database 125 and/or the content 415, 435, 455 repositories. The processor 115 may be operably connected to the server 120 via wired or wireless connection.

Search servers may include one or more computing devices 110 designed to implement a search engine, such as a documents/records search engine, general webpage search engine, etc. Search servers may, for example, may include one or more web servers to receive search queries and/or inputs from users 105, search one or more databases 125 in response to the search queries and/or inputs, and provide documents or information, relevant to the search queries and/or inputs, to users 105. In some implementations, search servers may include a web search server that may provide webpages to users 105, where a provided webpage may include a reference to a web server at which the desired information and/or links is located. The references, to the web server at which the desired information is located, may be included in a frame and/or text box, or as a link to the desired information/document.

Document indexing servers may include one or more computing devices 110 designed to index documents available through networks. Document indexing servers may access other servers 120, such as web servers that host content 415, 435, 455, to index the content 415, 435, 455. In some implementations, document indexing servers may index documents/records stored by other servers 120 connected to the network. Document indexing servers may, for example, store and index content 415, 435, 455, information, and documents relating to user profiles 135 and user-generated content 415, 435, 455. Web servers may include servers 120 that provide webpages to clients. For instance, the webpages may be HTML-based webpages. A web server may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

In some preferred embodiments, the system 100 may convert a combination of at least one digital code 114, environmental data 135B, and user data 135A into a digital fingerprint 136. In some embodiments, the data within the digital fingerprint 136 is preferably encrypted in a way such that the system 100 may extract said data from said digital fingerprint 136. The system 100 may then tag image data 135D with the digital fingerprint 136. Image data 135D tagged with an encrypted digital fingerprint 136 therefore contains data that cannot easily be altered by a user 105. In a preferred embodiment, tagged image data 135E created by the system 100 is a digitally watermarked image and/or an enhanced metadata image. A digitally watermarked image is image data 135D that has a watermark in the form of the digital fingerprint 136 embedded within the pixel data. Because the pixels of the image data 135D are changed by the digital fingerprint 136, the watermark cannot be removed by a user 105 once the digitally watermarked image has been created by the system 100. The system 100 may then confirm an image as legitimate by verifying the watermark within the image. An enhanced metadata image contains the digital fingerprint 136 within the metadata of the image data 135D. In a preferred embodiment, the digital fingerprint 136 of an enhanced metadata image is encrypted in a way such that a user 105 may not easily change the digital fingerprint 136 without altering the digital fingerprint 136 in a way that prevents the system 100 from verifying the image data 135D as legitimate.

As illustrated in FIG. 4, the system 100 may also comprise a plurality of permission levels 400 that may allow a user 105 to limit what data within their user profiles 135 they share with another user 105. This data may be collectively known as content 415, 435, 455. To access the content 415, 435, 455 stored within the database 125, users 105 may be required to make a request via a user interface 111. Access to the content 415, 435, 455 within the database 125 may be granted or denied by the processor 115 based on verification of a requesting user's 405, 425, 445 permission level 400. If the requesting user's 405, 425, 445 permission level 400 is sufficient, the processor 115 may provide the requesting user 405, 425, 445 access to content 415, 435, 455 stored within the database 125. Conversely, if the requesting user's 405, 425, 445 permission level 400 is insufficient, the processor 115 may deny the requesting user 405, 425, 445 access to content 415, 435, 455 stored within the database 125. In an embodiment, permission levels 400 may be based on user roles 410, 430, 450 and administrator roles 470, as shown in FIG. 4. User roles 410, 430, 450 allow requesting users 405, 425, 445 to access content 415, 435, 455 that a user has uploaded and/or otherwise obtained through use of the system 100. User roles 410, 430, 450 allow users 105 (or requesting users 405, 425, 445 authorized by the user 105) to access the data tied to their own user profiles 135 within the database 125. Administrator roles 470 allow administrators 465 to access system 100 wide data.

In an embodiment, user roles 410, 430, 450 may be assigned to a user 105 in a way such that a requesting user 405, 425, 445 may view user profiles 135 containing measurement data 135C, environmental data 135B, image data 135D, and user data 135A via a user interface 111. To access the data within the database 125, a user 105 may make a user request via the user interface 111 to the processor 115. In an embodiment, the processor 115 may grant or deny the request based on the permission level 400 associated with the requesting user 405, 425, 445. Only users 105 having appropriate user roles 410, 430, 450 or administrator roles 470 may access the data within the user profiles 135. For instance, as illustrated in FIG. 2, requesting user 1 405 has permission to view user 1 content 415 and user 2 content 435 whereas requesting user 2 425 only has permission to view user 2 content 435. Alternatively, user content 415, 435, 455 may be restricted in a way such that a user 105 may only view a limited amount of user content 415, 435, 455. For instance, requesting user 3 445 may be granted a permission level 400 that only allows them to view user 3 content 455 related to the length of wildlife/marine life 102 captured but not user 3 content 455 related to the geolocations in which said wildlife/marine life 102 was captured. In the example illustrated in FIG. 2, an administrator 465 may bestow a new permission level 400 on users 105 so that it may grant them greater permissions or lesser permissions. For instance, an administrator 465 may bestow a greater permission level 400 on other users 105 so that they may view user 3's content 455 and/or any other user's content 415, 435, 455. Therefore, the permission levels 400 of the system 100 may be assigned to users 105 in various ways without departing from the inventive subject matter described herein.

FIG. 5 provides a flow chart 500 illustrating certain, preferred method steps that may be used to carry out the method for capturing image data 135D, extracting measurement data 135C and a pattern from said image data 135D, and confirming the measurement data 135C as legitimate. Step 505 indicates the beginning of the method. During steps 510, the processor 115 may collect image data 135D using the camera of the computing device 110. Once collected, the processor 115 may save the image data 135D within a user profile 135 of the system 100 during step 515. The processor 115 may then perform a query to determine if measurement data 135C can be collected from the image data 135D during step 517. Based on the results of the query, the processor 115 may perform an action during step 520. If the processor 115 determines that measurement data 135C may be extracted from the image data 135D, the processor 115 may extract the image data 135D and subsequently save it during step 525 and 527, respectively. If the processor 115 determines that measurement data 135C may not be extracted from the image data 135D, the processor 115 may alert a user 105 via the user interface 111 of an error during step 523 and subsequently proceed to the terminate method step 560.

Once the measurement data 135C has been extracted, the processor 115 may perform a query to determine whether or not a pattern may be extracted from the image data 135D during step 530. Based on the results of the query, the processor 115 may take an action during step 535. If the processor 115 determines that no pattern may be extracted from the image data 135D, the processor 115 may proceed to step 557 and tag the image data 135D and measurement data 135C as illegitimate. If the processor 115 determines that a pattern may be extracted from the image data 135D, the processor 115 may extract the pattern during step 540. Once the pattern has been extracted, the processor 115 may transform the pattern into a digital code 114 during step 545. The system 100 may use a cypher to transform the pattern into a digital code 114, wherein a cypher may be defined as a set of rules used to convert a pattern of numbers and/or letters into a seemingly different set of numbers and/or letters. The system 100 may then perform a query to determine if the digital code 114 matches a digital key of the system 100 during step 550. The processor 115 may perform an action based on the results of the query during step 555. If the processor 115 determines that the digital code 114 does not match the digital key, the system 100 may tag the data as illegitimate during step 557. If the system 100 determines that the digital code 114 does match the digital key, the system 100 may tag the data as legitimate during step 558. Once the system 100 has determined that the data is legitimate or illegitimate, the system 100 may proceed to terminate method step 560.

FIG. 6 provides a flow chart 600 illustrating certain, preferred method steps that may be used to carry out the method of embedding a watermark containing encrypted environmental data 135B, image data 135D, and/or measurement data 135C on an image captured by a camera of a computing device 110. Step 605 indicates the beginning of the method. During steps 610, the processor 115 may perform a query to determine whether or not a digital code 114 may be recognized within image data 135D collected by the camera, wherein the recognized digital code 114 is one that matches a digital lock 113 of the system 100. Based on the results of the query, the processor 115 may take an action during step 615. If the processor 115 determines that the is no recognizable digital code 114, the processor 115 may proceed to the terminate method step 655. If the processor 115 determines that there is a recognizable digital code 114, the processor 115 may activate the UI of the computing device 110 in a way that may allow a user 105 to capture and save image data 135D with the camera during step 620. The computing device 110 may then capture image data 135D based on an input of the user 105 during step 625. In some preferred embodiments, the digital code 114 may be received by the computing device 110 from a wireless communication device of the control board 210, which may then be compared to a digital lock 113 of the system 100 prior to granting the user 105 access to the camera to capture image data 135D.

Once the image data 135D has been captured, the system 100 may save the image data 135D within the non-transitory computer-readable medium 116 and/or database 125 during step 630. The system 100 may then save environmental data 135B, measurement data 135C, and/or pattern associated with said image data 135D during step 635. In a preferred embodiment, geolocation data and length are associated with image data 135D by the system 100. The processor 115 may then create a digital fingerprint 136 containing the image data 135D, environmental data 135B, measurement data 135C, and/or pattern during step 640. In a preferred embodiment, a digital fingerprint 136 is created using a cryptographic hash function 130. A cryptographic hash function 130 may be defined as a mathematical algorithm that maps data of arbitrary size to a bit array of a fixed size. A cryptographic hash function 130 is preferably a one-way function, that is, a function which is practically infeasible to invert. Once the digital fingerprint 136 has been created, the system 100 may then create a digital image from the image data 135D during step 642 and subsequently place the digital fingerprint 136 over the digital image to create a digitally watermarked image during step 645. The digitally watermarked image may then be saved within the non-transitory computer-readable medium 116 and/or database 125 by the processor 115 during step 650. The system 100 may then proceed to the terminate method step 655.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one input/output device.

These computer programs, which may also be referred to as programs, software, software applications, applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter may be made without departing from the principles and scope of the inventive subject matter.

What is claimed is:

1. A system for confirming image data comprising:
a user identifier containing user data,
a light configured to emit a pattern,
a computing device having a camera,
  wherein said computing device obtains said user data via said user identifier,
  wherein said camera captures image data containing said pattern,
at least one sensor configured to obtain environmental data, and
a processor operably connected to said at least one sensor and said computing device,
  wherein said processor converts said user data, pattern, and environmental data into a digital fingerprint, and
  wherein said processor creates tagged image data using said digital fingerprint.

2. The system of claim 1, wherein said processor associates said user data with a user having a user profile.

3. The system of claim 2, wherein at least one of said image data and tagged image data is saved within said user profile of said user.

4. The system of claim 3, wherein said processor converts said pattern into a digital code and uses said digital code to authenticate said image data by comparing said digital code to a digital lock associated with said user profile.

5. The system of claim 1, wherein said tagged image data is at least one of a watermarked image and enhanced metadata image.

6. The system of claim 1, further comprising a measuring device,
  wherein said light and said user identifier are secured to said measuring device.

7. The system of claim 6, wherein markings of said measuring device communicate measurement data to said computing device, wherein said measurement data pertains to physical attributes of at least one of marine life and wildlife.

8. The system of claim 7, wherein said processor creates said digital fingerprint using said user data, digital code, environmental data, and measurement data.

9. The system of claim 1, further comprising hunting equipment,
  wherein said light and said user identifier are secured to said hunting equipment.

10. The system of claim 9, wherein said hunting equipment is one of a bow and a firearm.

11. The system of claim 1, further comprising fishing equipment,
  wherein said light and said user identifier are secured to said fishing equipment.

12. The system of claim 11, wherein said fishing equipment is one of a bow, rod, reel, tackle box, and marine vehicle.

13. The system of claim 1, further comprising a card,
  wherein said light and said user identifier are secured to said card.

14. A system for confirming image data comprising:
a user identification (UID) pattern containing user data,
a light configured to emit a light pattern,
a computing device having a camera,
  wherein said camera captures image data containing said user identification (UID) pattern and said light pattern,
at least one sensor configured to obtain environmental data,
a processor operably connected to said computing device and said at least one sensor,
a power supply, and
a non-transitory computer-readable medium coupled to said processor and having instructions stored thereon, which, when executed by said processor, cause said processor to perform operations comprising:
receiving said image data from said computing device,
extracting said user data from said user identification (UID) pattern,
  wherein said user data instructs said processor which user of a plurality of users captured said image data using said camera,
  wherein at least one of said image data and tagged image data is saved within a user profile of said user,
determining said light pattern emitted by said light in said image data,
converting said light pattern into a digital code,
checking said digital code against a digital lock, and
authenticating said image data when said digital code matches said digital lock.

15. The system of claim 14, further comprising additional instructions, which, when executed by said processor, cause said processor to perform additional operations comprising:
receiving said environmental data from said at least one sensor,
creating a digital fingerprint using said user data, digital code, and environmental data, and
creating said tagged image data using said digital fingerprint and said image data.

16. The system of claim 14, further comprising a measuring device,
wherein said light and said user identification (UID) pattern are secured to said measuring device,
wherein markings of said measuring device communicate measurement data to said computing device via said image data,
wherein said measurement data pertains to physical attributes of at least one of marine life and wildlife.

17. The system of claim 16, further comprising additional instructions, which, when executed by said processor, cause said processor to perform additional operations comprising:
receiving said environmental data from said at least one sensor, and
creating a digital fingerprint using said user data, digital code, environmental data, and measurement data, and
creating said tagged image data using said digital fingerprint and said image data.

18. A system for confirming image data comprising:
a near field communication device (NFC) device containing user data,
a light configured to emit a light pattern,
a computing device having a camera,
  wherein said camera captures image data containing said light pattern,
  wherein said computing device is configured to receive said user data from said NFC device,
at least one sensor configured to obtain environmental data,
a processor operably connected to said computing device and said at least one sensor,
a power supply, and
a non-transitory computer-readable medium coupled to said processor and having instructions stored thereon, which, when executed by said processor, cause said processor to perform operations comprising:
receiving said image data from said computing device,
receiving said user data from said NFC device,
  wherein said user data instructs said processor which user of a plurality of users captured said image data using said camera,
  wherein at least one of said image data and tagged image data is saved within a user profile of said user,
determining said light pattern emitted by said light in said image data,
converting said light pattern into a digital code,
checking said digital code against a digital lock, and
authenticating said image data when said digital code matches said digital lock.

19. The system of claim 18, further comprising additional instructions, which, when executed by said processor, cause said processor to perform additional operations comprising:
receiving said environmental data from said at least one sensor,
creating a digital fingerprint using said user data, digital code, and environmental data, and
creating said tagged image data using said digital fingerprint and said image data.

20. The system of claim 18, further comprising a measuring device,
wherein said light and said NFC device are secured to said measuring device,
wherein markings of said measuring device communicate measurement data to said computing device via said image data,
wherein said measurement data pertains to physical attributes of at least one of marine life and wildlife.

21. The system of claim 20, further comprising additional instructions, which, when executed by said processor, cause said processor to perform additional operations comprising:
receiving said environmental data from said at least one sensor, and
creating a digital fingerprint using said user data, digital code, environmental data, and measurement data, and
creating said tagged image data using said digital fingerprint and said image data.

22. A system for confirming image data comprising:
a user identifier containing user data,
a computing device having a camera,
  wherein said computing device obtains said user data via said user identifier,
  wherein said camera captures image data,
at least one sensor configured to obtain environmental data, and
a processor operably connected to said at least one sensor and said computing device,
  wherein said processor converts said user data and environmental data into a digital fingerprint, and
  wherein said processor creates tagged image data using said digital fingerprint and said image data.

23. The system of claim 22, wherein said processor associates said user data with a user having a user profile.

24. The system of claim 23, wherein at least one of said image data and tagged image data is saved within said user profile of said user.

25. The system of claim 22, wherein said tagged image data is at least one of a watermarked image and enhanced metadata image.

26. The system of claim 22, further comprising a measuring device,
wherein said user identifier is secured to said measuring device.

27. The system of claim 26, wherein markings of said measuring device communicate measurement data to said computing device, wherein said measurement data pertains to physical attributes of at least one of marine life and wildlife.

28. The system of claim 27, wherein said processor creates said digital fingerprint using said user data, environmental data, and measurement data.

29. The system of claim 22, further comprising hunting equipment,
   wherein said user identifier is secured to said hunting equipment.

30. The system of claim 29, wherein said hunting equipment is one of a bow and a firearm.

31. The system of claim 22, further comprising fishing equipment,
   wherein said user identifier is secured to said fishing equipment.

32. The system of claim 31, wherein said fishing equipment is one of a bow, rod, reel, tackle box, and marine vehicle.

33. The system of claim 22, further comprising a card, wherein said user identifier is secured to said card.

* * * * *